Jan. 26, 1965     R. LUKSO     3,167,667
PIEZOELECTRIC FORCE CONTROLLER
Filed Aug. 8, 1962     2 Sheets-Sheet 1

INVENTOR.
RICHARD LUKSO

INVENTOR.
RICHARD LUKSO

United States Patent Office 3,167,667
Patented Jan. 26, 1965

3,167,667
PIEZOELECTRIC FORCE CONTROLLER
Richard Lukso, Grand Rapids, Mich., assignor to
Lear Siegler, Inc.
Filed Aug. 8, 1962, Ser. No. 215,647
11 Claims. (Cl. 310—8.6)

This invention relates to a piezoelectric sensing and/or controlling device, and more particularly to a device capable of sensing movements and proportionately controlling a plurality of parameters independently and simultaneously in a highly sensitive manner.

Control of vehicles such as air and space craft necessitates variation of at least three independent parameters, usually roll, pitch and yaw. Various hydraulic, mechanical, and electrical mechanisms have been devised heretofore to achieve this control. Present electrical systems require either (1) bulky space-consuming sensors for producing a usable voltage output, or (2) elaborate, complex, and space-consuming electronic gear capable of amplifying tiny signals from miniature sensors such as strain gauges. These devices generally lack real accuracy and high sensitivity. They leave much to be desired in reliability. These prior units are not compact, nor are they simple in operation or construction. The large voltage output type (1) above requires a large physical displacement of the control "stick" (or its equivalent) for the creation of any significant output signal. The weak signal from the miniature sensor type (2) above must be amplified tremendously, and is prone to erratic signals, especially when so amplified.

It is therefore an object of this invention to provide an electric sensor and controller device requiring only a minimum of space. The device is rugged and compact. It requires only a few dependable electrical components, the characteristics of which are highly predictable and reliable.

It is another object of this invention to provide an adjustable, electrical sensor and/or controller that is extremely sensitive and accurate without the tendency of creating erratic signals. It further does not require amplification to obtain a large useful output voltage signal.

It is another object of this invention to provide a sensor and controller adapted to accurately control at least three parameters such as roll, pitch and yaw of a craft, independently of each other and simultaneously. This is effected by slight movements of a single control element or rod. Movement may be in one, two or three dimensions in only a few thousandths of an inch to result in exact proportionate control of the parameters. The device is readily and accurately adjustable to vary the required initial movement of the control element before the signal variation begins.

It is still another object of this invention to provide a piezoelectric sensor and/or controller for sensing tiny movements of an element by arresting oscillatory movement of piezoelectric translating devices. The output voltage signal of each piezoelectric means is directly proportional to the displacement of the rod element, and thus can be readily made proportional to the force supplied to the element. The device is so sensitive that displacement of each 0.001 of an inch can readily effect an output signal voltage increase of 1.0 volt.

It is another object of this invention to provide a sensor and controller utilizing a plurality of piezoelectric transformers coupled in pairs to sense and respond to manual shifting of a control rod in lateral and/or rotational directions to control roll, pitch and yaw of a craft.

These and several other objects of this invention will be apparent upon studying the following specification in conjunction with the drawings in which.

Basically, the inventive sensor comprises, a piezoelectric crystal adapted to emit a signal when deformed, means to oscillate the crystal to produce an output signal, and said crystal normally being restrained from oscillation by contact with a control element to be sensed. The crystal is mounted adjacent the movable element to allow oscillatory deformation of the crystal when the element is moved away, with the signal output voltage being proportional to the amount of movement of the element. More specifically, the invention comprises a controller, especially for simultaneously controlling three parameters such as the pitch, roll and yaw of a craft, including a control "stick" or rod element adapted to be shifted laterally in any direction, or rotatably and including a projecting moment arm adapted to rotatably shift therewith. At least four piezoelectric crystal sets or twins are positioned circumferentially around the rod in pairs opposite to each other, with the opposites of each pair cooperating, and a third pair positioned adjacent and on opposite sides of the arm. Each of the sets comprises a first electrically excitable crystal part adapted to oscillate when excited, and a second crystal part physically joined to the first and capable of emitting a signal when oscillated by the first crystal part. All of the sets are normally restrained from oscillation by the rod and arm. The rod is laterally shiftable away from any one or more of the sets and rotatable away from one of the sets to allow controlled oscillation to a degree proportionate to the respective movements of the rod, so that the output voltage signal of three of the six sets can independently and simultaneously control roll, pitch and yaw.

Figure 1:
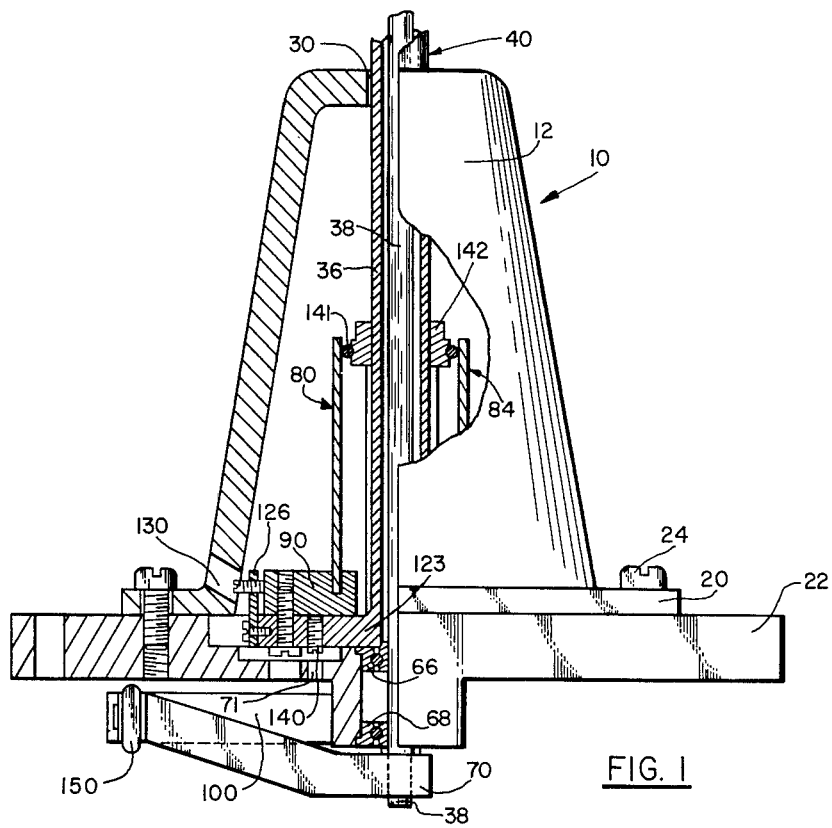
FIG. 1 is an elevational, partially sectioned view of one form of the novel device.

Referring now more specifically to the drawings. In FIG. 1 the novel sensing and control apparatus 10 is shown including the conical housing 12 composed of two halves 14 and 16 (FIG. 2) bolted together as by screws (not shown). The housing includes a lower, peripheral, radially-extending flange 20 enabling its attachment to a base plate 22 by screws 24. Protruding through opening 30 in the top of the housing is a control element force rod device 40 including an outer tube 36 and an inner rod or pin 38.

Figure 2:
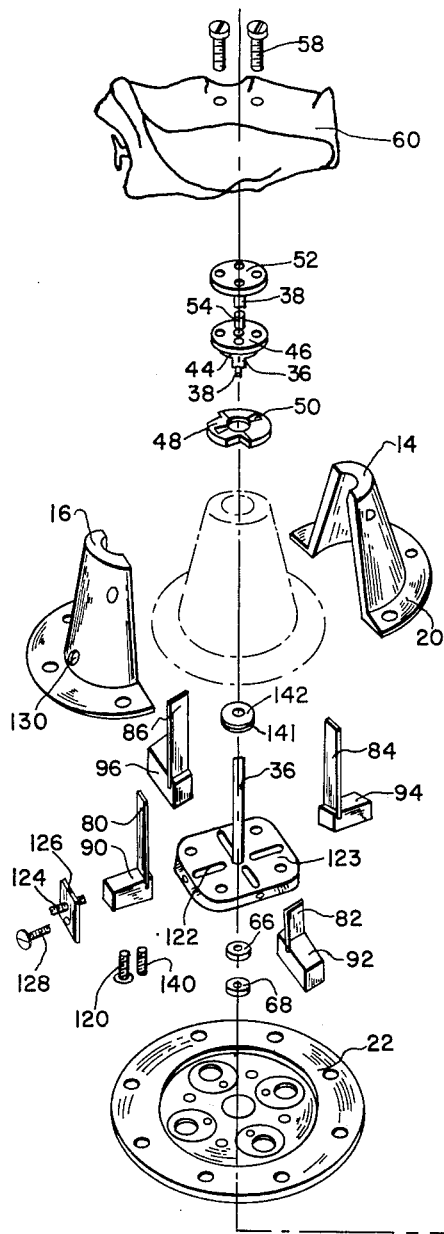
FIG. 2 is an exploded perspective view of the apparatus in FIG. 1.
Figure 2:
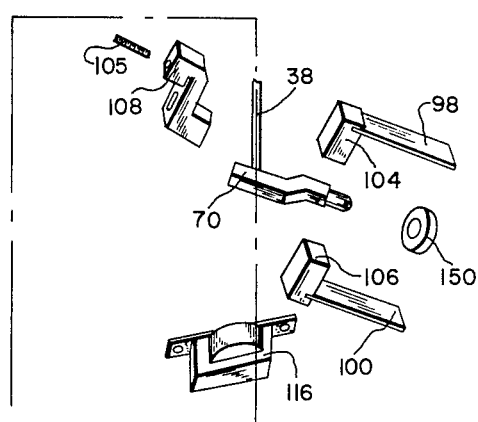
Figure 2:
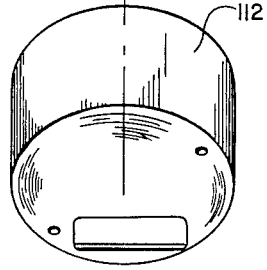

In FIG. 2 at the upper end of tube 36 is a pair of oppositely oriented, radially extending ears 44 which are affixed to the bottom of plate 46. These ears interfit in arcuate slots 50 in a gimbal 48, to allow limited torsional movement of the tube. The pin 38 extends through plate 46 and is affixed to plate 52. Plate 46 is attached to plate 52 by alignment pins 54 fitting into openings in plate 52, and by screws 58 which also secure configurated handle 60 to the plates. This force rod device or "stick" may be deformed laterally in any direction.

Inner pin 38 is rotatably mounted in a pair of bearings 66 and 68 in mounting plate 22. The control stick may thus be rotatably twisted. Twisting the stick which includes tube 36 and pin 38 rotates the lower end of pin 38 in bearings 66 and 68. Attached to the lower terminus of pin 38 is an arm 70 which projects laterally or radially. As pin 38 rotates, moment arm 70 pivots in an arc. In brief, the torsion applied to the upper end of the stick is changed into rotation of the lower end of rod 38, and is then changed to arcuate shifting of arm 70 due to the moment force applied.

Positioned circumferentially around force rod tube 36 is a plurality of four bi-morph piezoelectric crystal sets 80, 82, 84 and 86. These sets are in pairs on opposite sides of the force rod as shown in FIG. 2. Each crystal set is fixedly mounted at its lower end in crystal mounts 90, 92, 94 and 96 respectively. Each is therefore flexible in a cantilever fashion. A third pair of bi-morph piezoelectric crystal sets 98 and 100 is mounted beneath the base plate 22 (shown in FIG. 1) adjacent moment arm 70 in crystal mounts 104 and 106.

Figure 3:
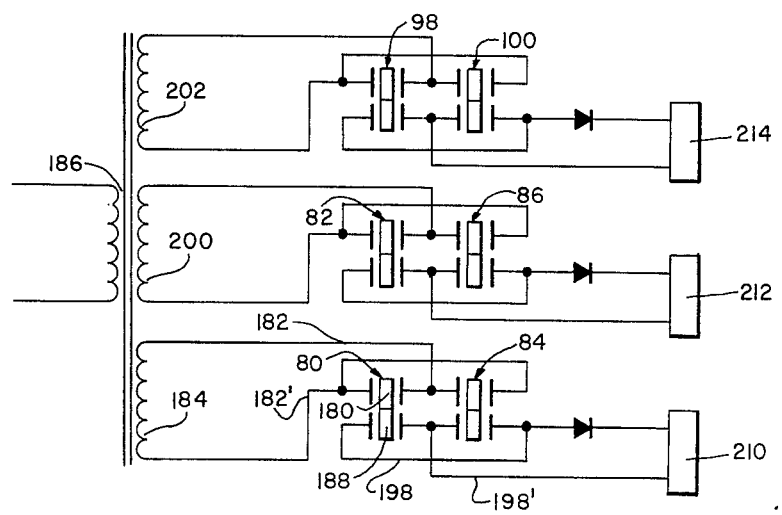
FIG. 3 is a schematic, circuit diagram of the apparatus.
Figure 4:
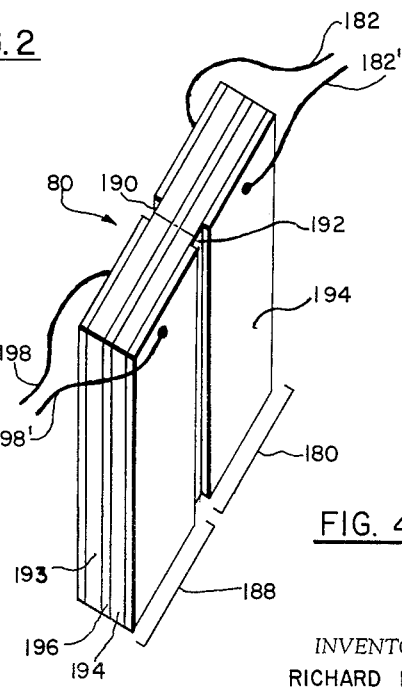
FIG. 4 is a perspective view of one crystal "set" used in this invention.

Each crystal "set" or "twin" is basically composed of two parts which are electrically insulated from each other but are physically bonded to each other. The preferred assembly for each set is shown in FIG. 4. One half or part 180 of each set has electrical leads 182 and 182' associated with an A.C. current source 184 such as transformer 186 illustrated in FIG. 3. The other half 188 (FIG. 4) is physically oscillated by the first half 180 but is electrically insulated therefrom because of gaps 190 and 192 in the metallic coating 194 such as silver on opposite sides of the set. In actual practice, it has been found best to have both halves or parts 180 and 188 formed by using a pair of elongated crystals 193 and 194 having a shim 196 such as brass therebetween. In other words, the opposite, laterally-positioned ends or sections (FIG. 4) of each elongated crystal are electrically independent but physically joined in an integral fashion. It is of course possible to have each elongated crystal physically formed of two separate lateral parts bonded together along a vertical, transverse dividing plane represented by the phantom line in FIG. 4, but this is not really necessary. Two elongated crystals separated by the shim are used instead of one long crystal since this provides an electrical series relationship producing twice the voltage that one would produce. Therefore the language "crystal part" when referring to 180 and 188, indicates the electrically-insulated, lateral ends of the assembly separated by the phantom line and identified by brackets in FIG. 4, whether physically bonded in the center or integrally joined in the center as shown. Thus, physical oscillation of part 180 by impressing an A.C. signal across leads 182 and 182' will oscillate part 188 to generate a signal voltage through output leads 198 and 198'. Maximum oscillation occurs at resonance frequencies of the particular crystal material used. The secondary, output signal voltage is in direct proportion to the range of oscillation and thus of deformation of crystal part 180. The crystals used may consist of any suitable piezoelectric material, for example, lead zirconate—lead titanate having a beneficial impurity therein. Each of the crystal sets acts as a piezoelectric transformer characterized by an initial piezoelectric conversion of electrical energy into mechanical energy, followed by a reconversion of the mechanical energy back into electrical energy. The sensors are presently excited with 115 volts, 400 cycle. Obviously, this may vary widely.

The lower crystal mounts 104 and 106 may each be attached to special brackets 108 (one of which is shown) secured to the bottom of base plate 22. The lower crystal sets are enclosed by cover 112. A transformer 116 is secured under the base plate and is enclosed by this cover 112.

The crystal mounts 90, 92, 94 and 96 are each adjustably mounted to the base plate by means of screws 120 which fit in slots 122 in the base 123 of tube 36. Control of adjustment is through jack screws 124 which are threadably engaged with plates 126. Each plate 126 is affixed to base 123 by screws 128. Each jack screw 124 may be adjusted by loosening fastening screw 120 and turning screw 124 through opening 130 in the housing. Screws 124 thus adjust the "dead zone" of the crystal sets as will be understood hereinafter. "Fine" adjustment of the crystal mounts and of each crystal set can be effected by screws 140 extending through base 123 into contact with mounts 90 etc. These effect "null adjustment." This same type of adjustability is provided for the lower crystal sets 98 and 100 between brackets 108 and crystal mounts 104 and 106 by screws 105. Contact between tube 36 and each crystal set is preferably through a rubber snubber ring 141 on collar 142 (FIG. 1). Likewise, a rubber snubber ring 150 is fitted to the outer end of moment arm 70 to contact the free ends of crystal sets 98 and 100.

Opposite crystal sets 80 and 84 each have one part electrically connected to secondary coil 184 of transformer 186 as stated, while sets 82 and 86 have one part connected to coil 200, and sets 98 and 100 have one part connected to coil 202.

Output leads 198 and 198' from the second respective parts of sets 80 and 84 are electrically connected with a voltage-responsive, pitch-varying device 210 (FIG. 3) such as a servo controller. Likewise, leads from sets 82 and 86 may be connected to a roll adjusted servo 212, and leads from sets 98 and 100 may be connected to a yaw adjuster 214.

Normally, the crystal sets are adjusted to be in contact against the rubber snubbers to prevent all oscillation of the crystals when the control element 40 is "at rest." With bending of tube 36 sideways away from one crystal set, this crystal set is allowed to oscillate under the stimulus of the excitation voltage. The intensity of the output signal from the second half of the crystal set will be dependent upon the degree of oscillation allowed. This is determined by the movement of the shaft away therefrom. Since the shaft is being distorted, the movement will normally be directly proportional to the force applied. Thus, the output signal, which may be utilized to vary the parameter concerned, will be in direct proportion to the force applied to the control element 40. The shaft may also be moved diagonally to free two of the crystal sets at one time to oscillate, with the signal emitted from each being directly proportional to the movement away from each one. It may simultaneously be twisted to cause moment arm 70 and its snubber to move away from one of the lower crystal sets, so that all three parameters may be independently, simultaneously varied controlled amounts to cause a controlled output voltage from each.

Operation

To sense and control a plurality of three parameters for roll, pitch, and yaw adjustment utilizing the novel device, it is only necessary for the operator to grasp handle 60 for movement in any lateral direction and/or torsional action. The "dead zone" adjustment for the control stick is made through the jack screws for each respective crystal set mount, to preset the zone of activity of the crystal. Relatively course adjustment may be made by loosening fastening screws 120, adjusting the jack screws 124, and retightening screws 120. If still a more sensitive adjustment is needed, a screw driver may be inserted in opening 71 in base plate 22 to adjust screw 140 against the bottom of each crystal mount to vary the slight deflection of each crystal set against the rubber snubber, and thereby determine the "break out" force or distance which the control stick must move away from the crystal to free it for oscillatory action. In other words, if the crystal is initially deformed slightly by its snubber, the snubber and rod will have to be moved a greater distance away from the crystal before an output signal begins. Each of the crystals is likewise adjusted, including the lower crystal sets. When the respective adjustments are made, the unit is then ready for operation.

Lateral movement of handle 60 and thus lateral deflection of tube 36 directly away from one or two of the four crystal sets arranged circumferentially around the shaft, will free that particular crystal set or crystal sets to oscillate under the A.C. stimulus. Simultaneously, the handle may be rotated to twist the central torsion pin 38 and shift snubber 150 away from one of the lower crystal sets, allowing an output signal to be emitted therefrom.

The nature of the signal emitted from any one pair is determined by which crystal set is freed to oscillate. If the control element is moved away from crystal set 80, for example, a signal of variable intensity depending upon the amount of movement will be emitted to vary the pitch "upwardly." If, on the other hand, the stick is bent in exactly the opposite direction, an opposite type signal will be emitted due to the fact that the take-off leads are arranged on respectively opposite sides as illustrated in FIG. 3. Therefore, the signal would cause a "downward" pitch. Likewise, if the shaft is moved away from the one crystal set 82 of the roll sensor, a signal of controlled intensity will be emitted to cause roll to the "right." If the shaft is moved away from the opposite crystal set 86, an opposite electrical signal will be emitted to cause roll to the "left." If moment arm 70 is rotated in one direction, snubber 150 will move away from and free one crystal set 98 for oscillation to cause yaw to the "right." If on the other hand, moment arm is rotated in the opposite direction, an opposite signal will be emitted to the yaw control mechanism to cause yaw to the "left."

It has been found that by utilizing a structure only a few inches high, output signals of up to 30 volts can be readily obtained without amplification. This can be achieved with only 0.030 of an inch movement of the control stick. A convenient ratio has been found to be 1 volt output signal per 1/1000 of an inch deformation or movement of the shaft and crystal set. The device is extremely sensitive since only tiny movements are required to produce significant output voltages for quick, simple control of the parameters.

Although the invention has been explained with respect to the sensing and controlling of three particular parameters, it will be readily understood by those in the art that sensing and control of one or any number of parameters may be achieved by proper utilization and spacing of pairs of crystal sets. For example, instead of the device being applied to control a vehicle in the manner explained, it may be readily used as a "slewing switch" for adjustment of an auto-pilot. Or it could be used in entirely different fields to sense and/or control such things as "follow-up" work on lathes, remote positioning of remote control mechanisms used with handling radioactive material and the like, or in any other environment requiring sensitivity of operation and accuracy of control. Thus, the invention is not to be limited to the forms illustrated for purposes of example, but it is only to be limited by the scope of the appended claims and the reasonably equivalent structures to those defined therein.

I claim:

1. A movement sensor comprising: a piezoelectric crystal adapted to emit a signal when deformed with the signal being generally proportionate to the deformation; active means operably associated with said crystal and causing a force tending to constantly deform said crystal; said crystal normally being restrained from deformation by contact with an element, the movement of which is to be sensed; and said crystal being mounted to allow deformation by said force in an amount generally proportionate to movement of said element, thereby creating a signal generally proportionate to movement of said element.

2. A movement sensor comprising: a deformable piezoelectric crystal adapted when oscillated to emit a signal generally proportional to the oscillatory deformation thereof; means creating a constant oscillatory force tending to oscillate said crystal; said crystal normally being restrained from oscillation by contact with an element the movement of which is to be sensed; and said crystal being mounted to allow oscillation by said oscillatory force generally proportionate to movement of said element, thereby creating a signal generally proportionate to movement of said element.

3. A sensing device comprising: a joined set of first and second piezoelectric crystal parts mounted to oscillate; one of said crystal parts adapted to be excited by an alternating current to oscillate both said crystal parts, and the other part adapted to emit a signal in proportion to the degree of oscillation; and an element adjacent said crystals movable to varying degrees between an oscillation-restraining position and a maximum-oscillation position, whereby relative movement of said element by a force causes creation of signals of proportionate intensity from said other part.

4. A control responsive apparatus comprising: a first piezoelectric crystal part; an alternating current excitation source for said crystal part to cause said crystal part to oscillate; a second piezoelectric crystal part physically associated with and electrically independent of said first crystal part to cause said second crystal part to oscillate with said first crystal part; an oscillation restraining member adjacent said crystal parts; and said member being movable in response to force to allow said crystal parts to oscillate and cause said second crystal part to impart a signal potential varying with the degree of movement of said member.

5. A sensor comprising: a shiftable element adapted to shift in opposite directions in at least one dimension; piezoelectric crystal means mounted on opposite sides of said element in said dimension; excitation means adapted to cause oscillation of each of said crystal means; each of said crystal means adapted to create a signal in general proportion to the extent of oscillation thereof; and said shiftable element causing varying amounts of oscillation curtailment of said crystal means with shifting thereof in one of said opposite directions, to thereby cause a corresponding signal change from one of said two crystal means.

6. A sensor comprising: a shiftable element adapted to shift in opposite directions in at least one dimension; piezoelectric crystal means mounted on opposite sides of said element in said dimension; excitation means adapted to cause oscillation of each of said crystal means; each of said crystal means adapted to cause the signal in general proportion to the extent of oscillation thereof; said shiftable element normally restraining oscillation of both of said crystal means, and being shiftable away from either one of said crystal means in response to a force thereon to allow the crystal means to oscillate an amount in general proportion to said shift and thereby emit a signal in general proportion to said shift.

7. A sensor comprising: a control element adapted to be shifted in at least two directions; two piezoelectric crystal means mounted adjacent said element in said two directions; each of said crystal means comprising a first crystal part adapted to be excited to create an oscillation thereof, and a second crystal part physically joined to and electrically separate from said first crystal part to oscillate therewith and create a second signal variable with the degree of oscillation; said shiftable element normally restraining oscillation of both of said crystal means, and being shiftable away from either one of said crystal means in response to a force thereon to allow the crystal means to oscillate an amount in general proportion to said shift and thereby emit a signal in general proportion to said shift.

8. A controller comprising: an element adapted to be shifted in at least four directions in two dimensions; a set of physically joined piezoelectric crystal parts mounted adjacent said element in each of said four directions; each of said sets including a first crystal part adapted to be oscillated by an excitation voltage and a second crystal part adapted to oscillate with said first crystal part and create an output signal voltage in proportion to its oscillations; each two of said sets in one dimension being related to respectively sense movement of said element in opposite directions; said element normally restraining oscillation of all of said crystals, and being shiftable in one or two directions simultaneously to allow one or two sets of crystals to oscillate an amount in proportion to the shift away from each crystal set, to thereby create voltage signals in proportion to the respective shifts.

9. A controller comprising: a rodlike device adapted to be shifted laterally in any direction; said device also being rotatably shiftable, and having a radially projecting moment arm adapted to shift rotatably therewith; at least four piezoelectric crystal sets circumferentially positioned around said device; an additional pair of crystal sets mounted on opposite sides of said arm; each of said sets comprising an electrically excitable crystal part adapted to oscillate when excited, and a physically associated signal generating crystal part adapted to generate a signal when oscillated by said excitable crystal; all of said sets normally being restrained from oscillation by said device and arm; and said device being laterally shiftable away from any one or two of said four sets to allow controlled oscillation thereof with resultant proportionate signal generation, and being simultaneously rotatable to shift said ear away from one set of said pair to allow controlled oscillation thereof with resulting proportionate signal generation, whereby a plurality of three parameters can be simultaneously controlled by selective movement of said rod.

10. The controller in claim 9 wherein said device comprises an outer tubular element adapted to contact said circumferentially positioned sets, an inner pin element attached to said arm, and has a hand grip secured to an end of both elements.

11. A controller for simultaneously controlling the pitch, roll, and yaw of a vehicle comprising: a control "stick" element adapted to be shifted laterally in any direction, and being rotatably shiftable; said stick having a radially projecting moment arm adapted to shift rotatably therewith; at least four piezoelectric crystal sets circumferentially positioned around said stick; an additional pair of crystal sets mounted on opposite sides of said arm; each of said sets comprising an electrically excitable crystal part adapted to oscillate when excited, and a physically associated signal generating crystal part adapted to generate when oscillated by said excitable crystal; all of said sets normally being restrained from oscillation by said stick and arm; two of said four sets being positioned oppositely to create opposite signals when allowed to oscillate for controlling roll in opposite directions; the other two of said four sets positioned oppositely to create opposite signals for control of pitch; said two sets adjacent said arm adapted to create opposite signals when allowed to oscillate for controlling yaw in opposite directions; said rod being laterally shiftable away from any one or two of said four sets to allow controlled oscillation thereof with resultant proportionate signal generation, and being simultaneously rotatable to shift said arm away from one set of said pair to allow controlled oscillation thereof with resulting proportionate signal generation, whereby roll, pitch and yaw can all be varied in controlled amounts independently and simultaneously by selective movement of said stick.

References Cited by the Examiner
UNITED STATES PATENTS

| | | | |
|---|---|---|---|
| 2,975,354 | 3/61 | Rosen | 310—8.1 |
| 2,988,714 | 6/61 | Tehon | 310—8.1 |
| 3,074,034 | 1/63 | Crownover | 310—8.1 |
| 3,104,334 | 9/63 | Bradley et al. | 310—9.1 |

MILTON O. HIRSHFIELD, *Primary Examiner*.